(12) United States Patent
Zhang et al.

(10) Patent No.: US 10,284,391 B2
(45) Date of Patent: May 7, 2019

(54) PACKET FORWARDING

(71) Applicant: New H3C Technologies Co., Ltd., Hangzhou, Zhejiang (CN)

(72) Inventors: Yang Zhang, Beijing (CN); Ling Kuang, Beijing (CN); Minghui Wang, Beijing (CN); Hongyuan Zhang, Beijing (CN); Hai Hu, Beijing (CN); Guangliang Wen, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 15/568,252

(22) PCT Filed: May 4, 2016

(86) PCT No.: PCT/CN2016/080957
§ 371 (c)(1),
(2) Date: Oct. 20, 2017

(87) PCT Pub. No.: WO2016/177321
PCT Pub. Date: Nov. 10, 2016

(65) Prior Publication Data
US 2018/0123828 A1    May 3, 2018

(30) Foreign Application Priority Data
May 4, 2015   (CN) .......................... 2015 1 0222676

(51) Int. Cl.
*H04L 12/66* (2006.01)
*H04L 12/46* (2006.01)
(Continued)

(52) U.S. Cl.
CPC ...... *H04L 12/4633* (2013.01); *H04L 12/4625* (2013.01); *H04L 12/4641* (2013.01);
(Continued)

(58) Field of Classification Search
None
See application file for complete search history.

(56) References Cited

U.S. PATENT DOCUMENTS 8,804,729 B1    8/2014  Melman et al.
8,923,155 B2   12/2014  Qu et al.
(Continued)

FOREIGN PATENT DOCUMENTS

CN   103095546 A   5/2013
CN   103200069 A   7/2013
(Continued)

OTHER PUBLICATIONS

International Search Report issued by ISA/CN for PCT/CN2016/080957 (dated Jul. 26, 2016).
(Continued)

*Primary Examiner* — Brandon M Renner
(74) *Attorney, Agent, or Firm* — McCoy Russell LLP

(57) ABSTRACT

An I/O board of a VXLAN switch searches out a layer 3 entry; when an egress port in the layer 3 entry is a VXLAN tunnel port, modifies a source MAC address of the packet into a gateway MAC address of the VXLAN switch, modifies a destination MAC address of the packet into a MAC address in the layer 3 entry, and sends the packet to a fabric board of the VXLAN switch. The fabric board determines to perform layer 2 forwarding for the packet, searches out a MAC entry, and when an egress port in the MAC entry is a VXLAN tunnel port, sends the packet to an I/O board associated with the egress port in the MAC entry. The I/O board associated with the egress port adds VXLAN encapsulation to the packet and forwards the packet with the VXLAN encapsulation to a VXLAN.

6 Claims, 4 Drawing Sheets

(51) Int. Cl.
*H04L 12/947* (2013.01)
*H04L 12/741* (2013.01)
*H04L 29/12* (2006.01)
*H04L 12/935* (2013.01)

(52) U.S. Cl.
CPC ........ *H04L 12/4645* (2013.01); *H04L 45/745* (2013.01); *H04L 49/25* (2013.01); *H04L 49/30* (2013.01); *H04L 49/3009* (2013.01); *H04L 61/2592* (2013.01); *H04L 61/2596* (2013.01); *H04L 61/6013* (2013.01); *H04L 61/6022* (2013.01); *H04L 2012/4629* (2013.01)

(56) References Cited

U.S. PATENT DOCUMENTS

| 8,934,501 | B2 | 1/2015 | Ramesh |
| 2013/0124750 | A1 | 5/2013 | Anumala et al. |
| 2014/0146817 | A1 | 5/2014 | Zhang |
| 2015/0009992 | A1* | 1/2015 | Zhang ................... H04L 49/354 370/392 |
| 2015/0358232 | A1* | 12/2015 | Chen ....................... H04L 45/72 370/392 |

FOREIGN PATENT DOCUMENTS

| CN | 104158718 | A | 11/2014 |
| CN | 104348726 | | 2/2015 |
| CN | 104350714 | A | 2/2015 |
| CN | 104378297 | | 2/2015 |
| CN | 104378300 | A | 2/2015 |
| WO | 2014028094 | A1 | 2/2014 |
| WO | 2014032620 | A1 | 3/2014 |
| WO | 2015000329 | A1 | 1/2015 |

OTHER PUBLICATIONS

European Patent Office, Extended European Search Report Issued in Application No. 16789314.8, dated Jan. 25, 2018, Germany, 11 pages.
European Patent Office, Extended European Search Report Issued in Application No. 16789315.5, dated Feb. 1, 2018, Germany, 9 pages.
European Patent Office, Extended European Search Report Issued in Application No. 16789308.0, dated Feb. 5, 2018, Germany, 11 pages.
United States Patent and Trademark Office, Office Action Issued in U.S. Appl. No. 15/567,887, dated Sep. 5, 2018, 18 pages.
United States Patent and Trademark Office, Office Action Issued in U.S. Appl. No. 15/567,747, dated Sep. 7, 2018, 16 pages.
Japanese Patent Office, Office Action Issued in Application No. 2018509961, dated Sep. 11, 2018, 9 pages.
State Intellectual Property Office of the People's Republic of China, Office Action and Search Report Issued in Application No. 201510220901.6, dated Dec. 5, 2018, 9 pages.
State Intellectual Property Office of the People's Republic of China, Office Action and Search Report Issued in Application No. 201510222676.X, dated Dec. 11, 2018, 8 pages.
European Patent Office, Office Action Issued in Application No. 16789314.8, dated Dec. 17, 2018, Germany, 5 pages.
State Intellectual Property Office of the People's Republic of China, Office Action and Search Report Issued in Application No. 201510222700.X, dated Dec. 27, 2018, 12 pages.

* cited by examiner

PACKET FORWARDING

BACKGROUND

Virtual extensible Local Area Network (VXLAN) is a layer 2 Virtual Private Network (VPN) technology based on an Internet Protocol (IP) network and adopting "Media Access Control (MAC) in User Data Protocol (UDP)" encapsulation. The VXLAN may implement layer 2 interconnection among distributed physical sites based on service providers or enterprise IP networks, and may provide service isolation for different tenants. The VXLAN may be applied to a data center network.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A frame-type switch includes a main board, an Input/Output (I/O) board and a fabric board. The main board is a single board for implementing calculation of a protocol stack, distribution and control of a forwarding entry and device management. The I/O board is a single board for implementing forwarding of data packets, for example, internal forwarding and external forwarding of data packets. The fabric board is a single board for forwarding a data packet and a control packet between boards and between chips inside a device. A chip on the fabric board has a packet forwarding function and may forward packets between different I/O boards.

Similar to the structure of the frame-type switch, a VXLAN switch includes a main board, an I/O board and a fabric board. In an example, the number of I/O boards is larger than 1.

In a VXLAN application, the fabric board of the VXLAN switch is set as the fabric board of the frame-type switch. A chip on the fabric board of the VXLAN switch has a packet forwarding function and may forward packets between different I/O boards.

In some examples of the present disclosure, a VXLAN switch may be selected as a gateway. The VXLAN switch selected as the gateway is called a gateway VXLAN switch and may be improved.

The gateway VXLAN switch may be improved as follows.

The fabric board of the gateway VXLAN switch uses a chip with a forwarding function and various entry functions. The entry functions include a function of receiving and saving an entry distributed by the main board, an entry searching function and so on. For example, the chip used by the fabric board may be a switch chip used by the I/O board of the gateway VXLAN switch.

When the fabric board of the gateway VXLAN switch uses the chip with the forwarding function and the entry functions, layer 3 forwarding of a packet entering the gateway VXLAN switch may be implemented via the cooperation of the I/O board and the fabric board of the gateway VXLAN switch. A method for forwarding a packet from a Virtual Local Access Network (VLAN) to a VXLAN will be described hereinafter with reference to some examples and FIG. 1.

Figure 1:
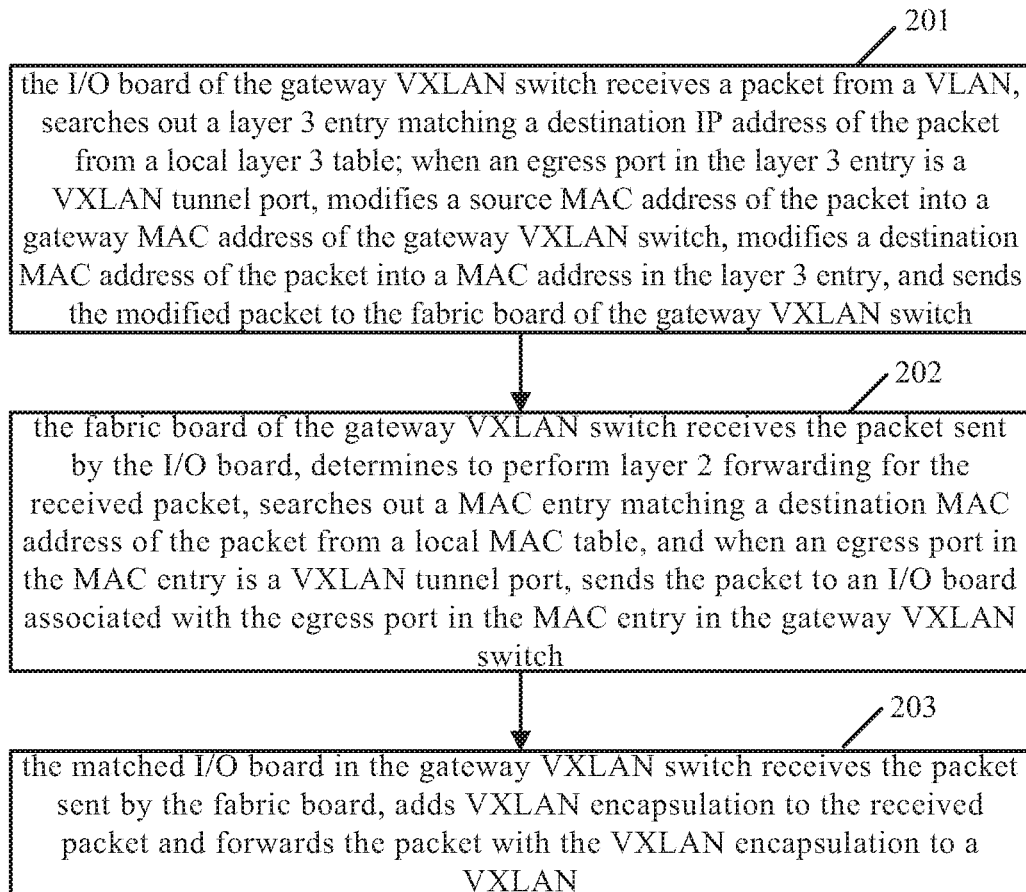
FIG. 1 is a flowchart illustrating a method for forwarding a packet from a VLAN to a VXLAN according to some examples of the present disclosure.

FIG. 1 is a flowchart illustrating a method for forwarding a packet from a WAN to a VXLAN according to some examples of the present disclosure. The method may be applied to a gateway VXLAN switch. The fabric board of the gateway VXLAN switch uses a chip with a forwarding function and various entry functions. For example, the chip used by the fabric board may be the same as that used by the I/O board of the gateway VXLAN switch. Accordingly, as shown in FIG. 1, the method includes following blocks 201 to 203.

At block 201, the I/O board of the gateway VXLAN switch receives a packet from a VLAN, searches out a layer 3 entry matching a destination IP address of the packet, from a local layer 3 table; when an egress port in the layer 3 entry is a VXLAN tunnel port, modifies a source MAC address of the packet into a gateway MAC address of the gateway VXLAN switch, modifies a destination MAC address of the packet into a MAC address in the layer 3 entry, and sends the modified packet to the fabric board of the gateway VXLAN switch.

In an example of the present disclosure, the local layer 3 table of the I/O board may be learned by the I/O board according to a layer 3 entry learning method, or configured by the main board, or learned by the main board according to the layer 3 entry learning method and distributed to the I/O board. In an example, the layer 3 entry may be a routing entry, and may include a destination IP address, a VLAN Identity (ID), a destination MAC address, a source MAC address, an egress port and so on. According to the contents included in the layer 3 entry, the layer 3 entry matching the destination IP address of the packet at block 201 is a layer 3 entry including the destination IP address of the packet.

Figure 2:
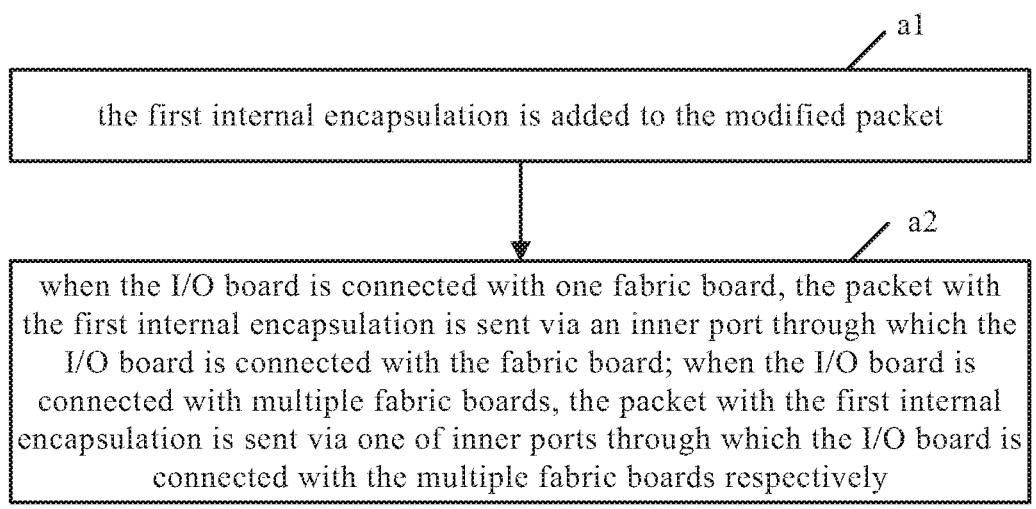
FIG. 2 is a flowchart illustrating a method for sending a modified packet to a fabric board by an I/O board according to some examples of the present disclosure.

In an example of block 201, in order to ensure that the modified packet can be sent from the I/O board to the fabric board, the I/O board may add internal encapsulation to the packet. For example, this internal encapsulation may be called first internal encapsulation. Accordingly, in an example of block 201, a method for sending the modified packet to the fabric board by the I/O board includes following blocks a1 and a2, referring to FIG. 2.

At block a1, the first internal encapsulation is added to the modified packet.

The first internal encapsulation includes a first destination chip identity and a first destination port identity. The first destination chip identity is a first virtual chip identity, and the first destination port identity is a first virtual port identity.

In an example of the present disclosure, the first virtual chip identity may be a pre-configured virtual chip identity for indicating the fabric board to continue entry searching and packet forwarding. The first virtual port identity may be a pre-configured virtual port identity for indicating the fabric hoard to continue entry searching and packet forwarding. When the gateway VXLAN switch includes multiple fabric boards, all fabric hoards are configured with the first virtual chip identity and the first virtual port identity.

At block a2, when the I/O board is connected with one fabric board, the packet with the first internal encapsulation is sent via an inner port through which the I/O board is connected with the fabric board; when the I/O board is connected with multiple fabric boards, the packet with the first internal encapsulation is sent via one of inner ports through which the I/O board is connected with the multiple fabric boards respectively.

When the I/O board is connected with multiple fabric boards, the inner ports through which the I/O board is connected with the multiple fabric boards respectively may be bundled in an inner port group. Accordingly, in an example of block a2, a process of sending the packet with the first internal encapsulation via one of inner ports through which the I/O board is connected with the multiple fabric boards respectively includes: selecting an inner port from the inner port group and sending the packet with the first internal encapsulation via the selected inner port. There are multiple methods for selecting an inner port from the inner port group, for example, selecting an inner port randomly, or selecting an inner port according to an algorithm such as a Hash algorithm.

According to blocks a1 and a2, the I/O board of the gateway VXLAN switch can send the modified packet to the fabric board of the gateway VXLAN switch.

At block 202, the fabric board of the gateway VXLAN switch receives the packet sent by the I/O board, determines to perform layer 2 forwarding for the received packet, searches out a MAC entry matching a destination MAC address of the packet from a local MAC table, and when an egress port in the MAC entry is a VXLAN tunnel port, sends the packet to an I/O board associated with the egress port in the MAC entry in the gateway VXLAN switch.

In an example of the present disclosure, the I/O board associated with the egress port in the MAC entry is called a matched I/O board.

Based on the first internal encapsulation described at block 201, a process of determining to perform layer 2 forwarding for the received packet by the fabric board is implemented as follows.

The fabric board determines the first destination chip identity and the first destination port identity in a first internal encapsulation header of the received packet. If the first destination chip identity is the first virtual chip identity and the first destination port identity is the first virtual port identity, the fabric board removes the first internal encapsulation from the packet. If the destination MAC address of the packet is not the gateway MAC address of the gateway VXLAN switch after the first internal encapsulation is removed, the fabric board determines to perform layer 2 forwarding for the received packet.

In an example of block 202, the local MAC table of the fabric board may be configured by the main board, or learned by the main board according to a MAC entry learning method and distributed to the fabric board. When the egress port in the MAC entry is a VXLAN tunnel port, the VXLAN tunnel port is a virtual tunnel port. In an example of the present disclosure, the VXLAN tunnel port may be represented with a VXLAN tunnel encapsulation index. For example, the VXLAN tunnel port may be represented with Tunnel1. Tunnel1 is the VXLAN tunnel encapsulation index.

Figure 3:
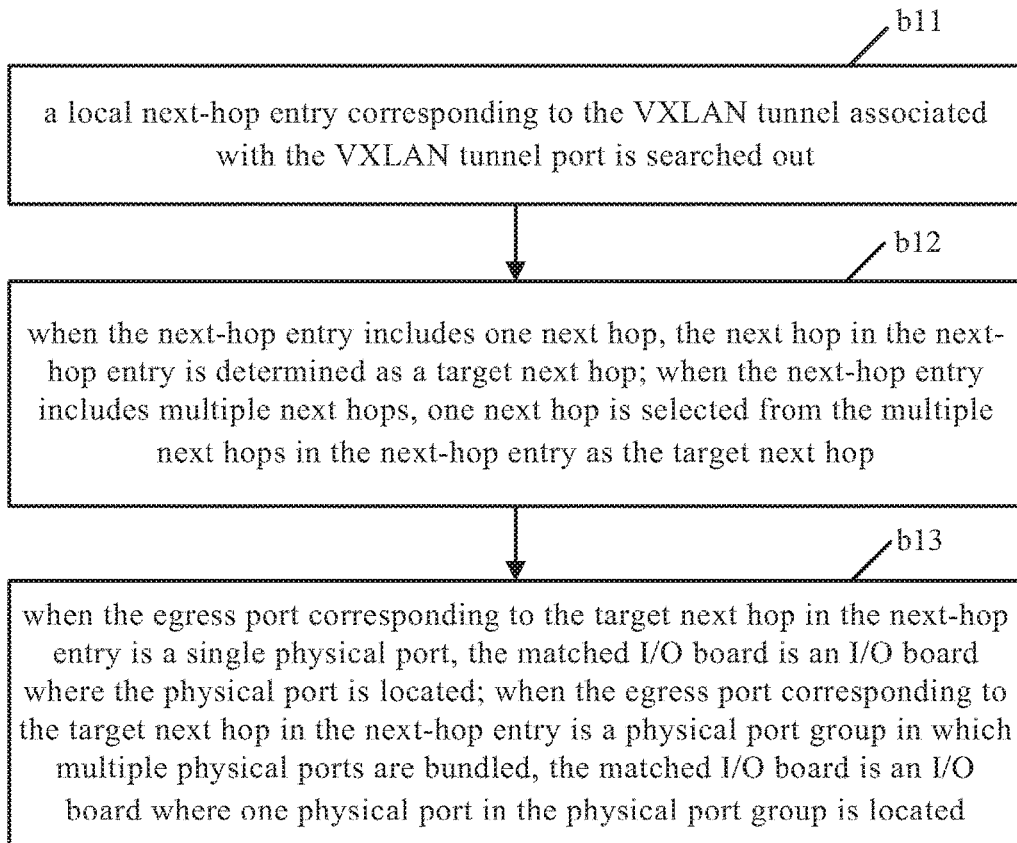
FIG. 3 is a flowchart illustrating a method for determining a matched I/O board according to some examples of the present disclosure.

In an example of the present disclosure, the matched I/O board described at block 202 may be determined according to a next-hop entry corresponding to a VXLAN tunnel associated with a VXLAN tunnel port, where the VXLAN tunnel port is the egress port in the MAC entry. In an example, a method for determining the matched I/O board includes following blocks, referring to FIG. 3.

At block b11, a local next-hop entry corresponding to the VXLAN tunnel associated with the VXLAN tunnel port is searched out.

At block b12, when the next-hop entry includes one next hop, the next hop in the next-hop entry is determined as a target next hop; when the next-hop entry includes multiple next hops, one next hop is selected from the multiple next hops in the next-hop entry as the target next hop.

There are multiple methods for selecting one next hop from the multiple next hops in the next-hop entry, for example, selecting one next hop randomly, or selecting one next hop according to a selection method such as a Hash algorithm.

At block b13, when the egress port corresponding to the target next hop in the next-hop entry is a single physical port, the matched I/O board is an I/O board where the physical port is located; when the egress port corresponding to the target next hop in the next-hop entry is a physical port group in which multiple physical ports are bundled, the matched I/O board is an I/O board where one physical port in the physical port group is located.

Herein, one physical port in the physical port group may be selected from the physical port group. There are multiple methods for selecting one physical port from the physical port group, for example, selecting one physical port randomly, or selecting one physical port according to a selection method such as a Hash algorithm.

Accordingly, the matched I/O board can be determined according to blocks b11 to b13.

In an example of the present disclosure, the fabric board adds second internal encapsulation to the modified packet and sends the packet with the second internal encapsulation to the matched I/O board. Accordingly, the matched I/O board may add VXLAN encapsulation to the packet with the second internal encapsulation sent by the fabric board and forwards the packet with VXLAN encapsulation to a VXLAN.

Figure 4:
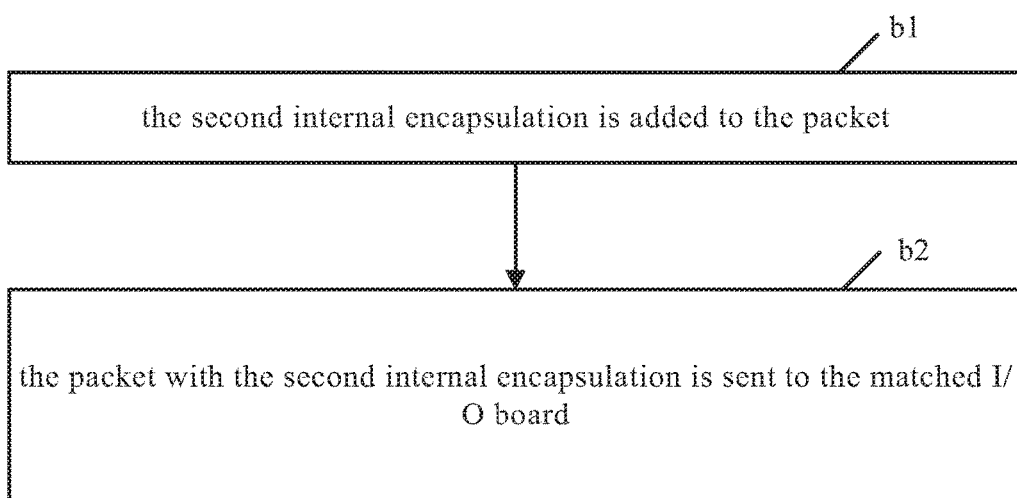
FIG. 4 is a flowchart illustrating a method for sending a packet to a matched I/O board according to some examples of the present disclosure.

Accordingly, in an example of block 202, a method for sending the packet to the matched I/O board includes following blocks, referring to FIG. 4.

At block b1, the second internal encapsulation is added to the packet.

The second internal encapsulation includes information of the egress port in the MAC entry. When the egress port in the MAC entry is a VXLAN tunnel port, the VXLAN tunnel port may be represented with a VXLAN tunnel encapsulation index. Accordingly, the information of the egress port in the MAC entry included by the second internal encapsulation may be equivalent to the VXLAN tunnel encapsulation index.

At block b2, the packet with the second internal encapsulation is sent to the matched I/O board.

According to blocks b1 and b2, the packet received from the fabric board by the matched I/O board is the packet with the second internal encapsulation.

At block 203, the matched I/O hoard in the gateway VXLAN switch receives the packet sent by the fabric board, adds VXLAN encapsulation to the received packet and forwards the packet with the VXLAN encapsulation to a VXLAN.

In an example of block 203, a process of adding the VXLAN encapsulation to the received packet and forwarding the packet with the VXLAN encapsulation to the VXLAN is implemented as follows.

The matched I/O board determines the information of the egress port in a second internal encapsulation header of the packet and removes the second internal encapsulation from the packet. The matched I/O board searches out a VXLAN tunnel encapsulation entry from a local VXLAN tunnel encapsulation table according to the information of the egress port, determines a Virtual Network II) (VNID) corresponding to the information of the egress port, adds the VXLAN encapsulation to the packet according to the searched-out VXLAN tunnel encapsulation entry and the determined VNID, and sends the packet with the VXLAN encapsulation via an egress port in the VXLAN tunnel encapsulation entry.

The VNID corresponding to the information of the egress port may be determined according to a predefined local VNID table. A VNID entry in the VNID table may include a VNID and a VXLAN tunnel encapsulation index. When the egress port in the MAC entry is a VXLAN tunnel port, the VXLAN tunnel port may be represented with a VXLAN tunnel encapsulation index. Accordingly, the VXLAN tunnel encapsulation index may be equivalent to the information of the egress pork in the MAC entry. Accordingly, a process for determining the VNID corresponding to the information of the egress port may include: searching out a VNID entry including the information of the egress port from the predefined local VNID table, and determines a VNID in the searched-out VNID entry as the VNID corresponding to the information of the egress port.

The egress port in the MAC entry is the VX LAN tunnel port. When the VXLAN tunnel port may be represented with the VXLAN tunnel encapsulation index, the process of searching out the VXLAN tunnel encapsulation entry from the local VXLAN tunnel encapsulation table according to the information of the egress port means that the VXLAN tunnel encapsulation entry is searched out from the local VXLAN tunnel encapsulation table according to the VXLAN tunnel encapsulation index.

A process of adding the VXLAN encapsulation to the packet according to the VXLAN tunnel encapsulation entry and the VNID includes: adding a VXLAN outer layer header to the packet according to the VXLAN tunnel encapsulation information in the VXLAN tunnel encapsulation entry, and adding a VXLAN field (for example, a VNID field) to the packet according to the VNID. The VXLAN outer layer header includes outer Ethernet (ETH) encapsulation. The outer ETH encapsulation includes an outer source MAC address, an outer destination MAC address, an outer source IP address and an outer destination IP address.

In an example of the present disclosure, a process of sending the packet via the egress port in the searched-out VXLAN tunnel encapsulation entry includes: identifying the egress port in the searched-out MAC entry; if the egress port is a single physical port, sending the packet via the single physical port; if the egress port is a physical port group in which multiple physical ports are bundled, selecting one physical port from the physical port group, and sending the packet via the selected physical port. The physical port cannot be selected randomly, but should be the same as the physical port selected by the fabric board when determining the matched I/O board. There are multiple methods for selecting the physical port by the I/O board to ensure that the selected physical port is the same as the physical port selected by the fabric board. For example, the fabric board selects the physical port according to a Hash algorithm, and the I/O board also selects the physical port according to the Hash algorithm.

In an example of the present disclosure, the local encapsulation entries of the I/O board may be configured on the I/O board in advance.

In an example of the present disclosure, the fabric board of the gateway VXLAN switch uses a chip with a forwarding function and various entry functions, for example, a chip that is the same as that used by the I/O board. Accordingly, when the gateway VXLAN switch receives the packet from the VLAN via the I/O board, the layer 3 entry matching the destination IP address of the packet is searched out from the local layer 3 table of the I/O hoard. When the egress port in the layer 3 entry is a VXLAN tunnel port, the I/O board modifies the source MAC address and the destination MAC address of the packet and sends the modified packet to the fabric board. The MAC entry matching the destination MAC address of the packet is searched out from a local MAC table of the fabric board. When the egress port in the MAC entry is a VXLAN tunnel port, an I/O board associated with the egress port in the layer 3 entry in the gateway VXLAN switch adds the VXLAN encapsulation to the packet and forwards the packet with the VXLAN encapsulation to a VXLAN. Accordingly, a VXLAN layer 3 gateway function may be implemented via the gateway VXLAN switch, the packet may be forwarded from the VXLAN to the VXLAN, and the whole process is performed inside the gateway VXLAN switch. Accordingly, any bandwidth resources are not wasted and wire speed forwarding of the packet can be implemented.

The flowchart shown in FIG. 1 will be described according to an example.

Figure 5:
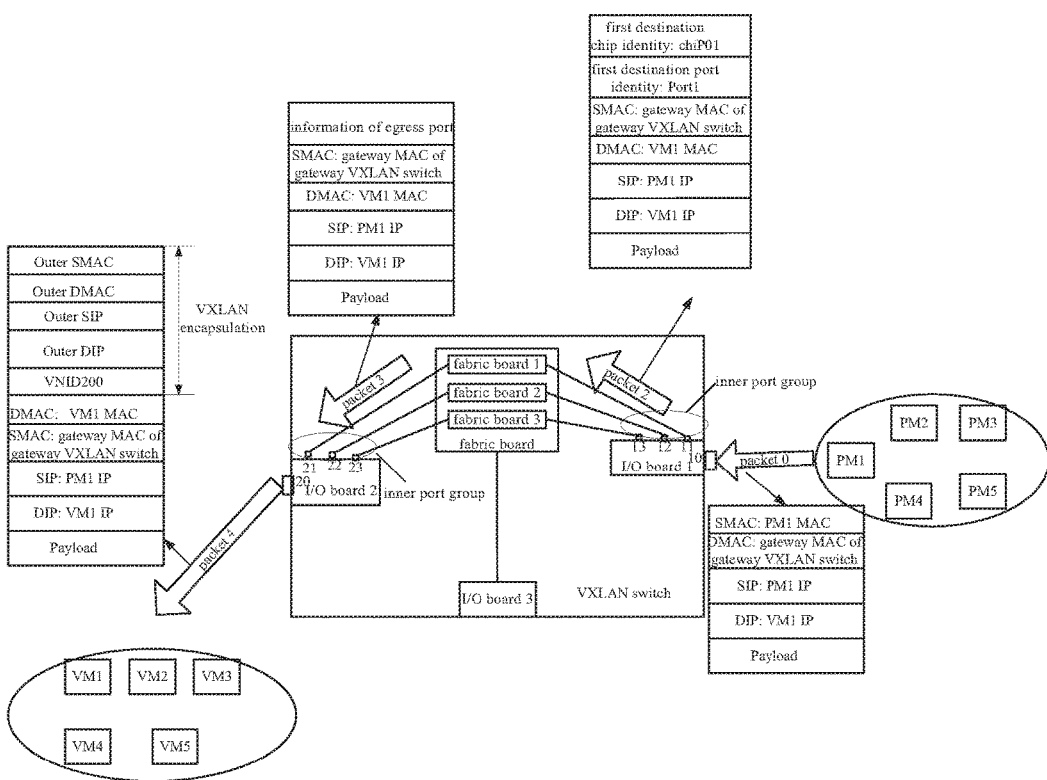
FIG. 5 is a diagram illustrating a networking structure for forwarding a packet from a VLAN to a VXLAN according to some examples of the present disclosure.

FIG. 5 is a diagram illustrating a networking structure for forwarding a packet from a VLAN to a VXLAN according to some examples of the present disclosure. As shown in FIG. 5, Physical Machine (PM) 1 to PM5 are devices in a VLAN, and Virtual Machine (VM) 1 to VM5 are devices in a VXLAN. A gateway VXLAN switch is connected between the VLAN and the VXLAN, and includes a main board, an I/O board and a fabric board. The main board is not shown in FIG. 5. The fabric board uses a chip with a forwarding function and various entry functions. The chip used by the fabric board is the same as that used by the I/O board. FIG. 5 shows three I/O boards of the VXLAN switch.

A process of forwarding a packet from a VLAN to a VXLAN will be described, in which the PM1 visits the VM1.

The I/O board 1 of the gateway VXLAN switch receives a packet from the PM1 via a local port (for example, port 10 in FIG. 5). Herein, the packet received by the I/O board is called packet 0.

The I/O board 1 searches out a layer 3 entry matching the destination IP address of the packet 0 from a local layer 3 table.

If an egress port in the searched-out layer 3 entry is a VXLAN tunnel port, it is indicated that the packet 0 is to be forwarded to the fabric board. The I/O board 1 modifies the source MAC address of the packet 0 into a gateway MAC address of the gateway VXLAN switch, and modifies the destination MAC address of the packet 0 into a destination MAC address in the searched-out layer 3 entry. In FIG. 5, the destination MAC address in the searched-out layer 3 entry is the MAC address of VM1. Herein, the packet 0 whose source MAC address and destination MAC address have been modified is called packet 1.

The I/O board 1 adds first internal encapsulation to the packet 1. A first destination chip identity in the first internal encapsulation is a first virtual chip identity (for example, chip 01 shown in FIG. 5), and a first destination port identity in the first internal encapsulation is a first virtual port identity (for example, port1 shown in FIG. 5). Herein, the packet 1 with the first internal encapsulation is called packet 2.

As shown in FIG. 5, the I/O board 1 is connected with each fabric board via an inner port group in which inner port 11, inner port 12 and inner port 13 are bundled. The I/O board 1 selects one inner port from the inner port group, for example, selects the inner port 11 shown in FIG. 5 to send the packet 2 to fabric board 1. A method for selecting an inner port by the I/O board 1 may be configured in advance. For example, the I/O board 1 may perform a Hash operation for the destination IP address of the packet 2 according to a Hash algorithm, and selects an inner port whose number corresponds to a Hash operation result.

The fabric board 1 receives the packet 2, determines that the first destination chip identity and the first destination port identity in the first internal encapsulation header of the packet 2 are chip 01 and port 1 respectively, which are the first virtual chip identity and the first virtual port identity respectively, and removes the first internal encapsulation from the packet 2. In this case, the packet 1 is restored.

The fabric board 1 identifies the destination MAC address of the packet 1, finds that the destination MAC address of the packet 1 is not the gateway MAC address of the gateway VXLAN switch, and determines to perform layer 2 forwarding for the packet 1.

The fabric board 1 searches out a MAC entry matching the destination MAC address of the packet 1 from a local MAC table. The fabric board 1 finds that an egress port in the searched-out MAC entry is a VXLAN tunnel port, and searches out a local next-hop entry corresponding to a VX LAN tunnel associated with the VXLAN tunnel port. If the searched-out next-hop entry has one next hop and the egress port of the next hop is a physical port group in which multiple physical ports are bundled, the fabric board 1 selects an I/O board where a physical port in the physical port group is located as a matched I/O board. When the egress port of the next hop is a single physical port, the fabric board 1 selects an I/O board where the single physical port is located as the matched I/O hoard. Herein, it is supposed that the matched I/O board is I/O board 2.

The fabric hoard 1 adds second internal encapsulation to the packet 1. Herein, the packet 1 with the second internal encapsulation is called packet 3. The second internal encapsulation includes information of the egress port in the searched-out MAC entry. When the egress port in the searched-out MAC entry is a VXLAN tunnel port, the VXLAN tunnel port may be represented with a VXLAN tunnel encapsulation index. The information of the egress port included by the second internal encapsulation may be equivalent to the VXLAN tunnel encapsulation index.

The fabric board 1 sends the packet 3 to the I/O board 2 via an inner port through which the fabric board 1 is connected with the I/O board 2.

The I/O board 2 receives the packet 3 sent by the fabric board 1, and determines the information of the egress port in a second internal encapsulation header of the packet 3, and removes the second internal encapsulation from the packet 3. In this case, the packet 1 is restored.

The I/O board 2 searches out a VXLAN tunnel encapsulation entry from a local VXLAN tunnel encapsulation table according to the information of the egress port, and determines a VNID corresponding to the information of the egress port.

The I/O board 2 adds VXLAN encapsulation to the packet 1 according to the searched-out VX LAN tunnel encapsulation entry and the determined VNID, and sends the packet 1 with the VXLAN encapsulation via an egress port in the VXLAN tunnel encapsulation entry. Herein, the packet 1 with the VXLAN encapsulation is called packet 4.

A process of adding the VXLAN encapsulation to the packet 1 according to the searched-out VXLAN tunnel encapsulation entry and the determined VNID by the I/O board 2 includes: adding a VXLAN outer layer header to the packet 1 according to the VXLAN tunnel encapsulation information in the VXLAN tunnel encapsulation entry, and adding a VXLAN field (for example, a VNID field) to the packet 1 according to the VNID (i.e., the VNID of a VXLAN to which the egress port belongs, for example, the VNID 200 of the VXLAN shown in FIG. 5). The VXLAN outer layer header of the packet 1 shown in FIG. 5 includes outer Ethernet (ETH) encapsulation. The outer ETH encapsulation includes an outer source MAC address, an outer destination MAC address, an outer source IP address and an outer destination IP address.

The I/O board 2 sends the packet 4 according to the egress port in the searched-out VXLAN tunnel encapsulation entry. In an example, a process of sending the packet 4 according to the egress port in the searched-out VXLAN tunnel encapsulation entry by the I/O board 2 includes: identifying the egress port in the searched-out VXLAN tunnel encapsulation entry. The identified egress port is an egress port of a next hop found by the fabric board 1. When the egress port of the next hop found by the fabric board 1 is a physical port group in which multiple physical ports are bundled, the identified egress port in the searched-out VXLAN tunnel encapsulation entry is the physical port group. Accordingly, the I/O board 2 may select one physical port from the identified egress ports according to a method for selecting a physical port by the fabric board 1 when determining the matched I/O board, thereby ensuring that the port sending the packet 4 is identical to the physical port selected by the fabric board 1.

The VM1 of the VXLAN can receive the packet sent by the PM1. Accordingly, the packet can be forwarded from the VLAN to the VXLAN via the gateway VXLAN switch.

An apparatus for forwarding a packet from a VLAN to a VXLAN will be described with reference to examples hereinafter.

Figure 6:
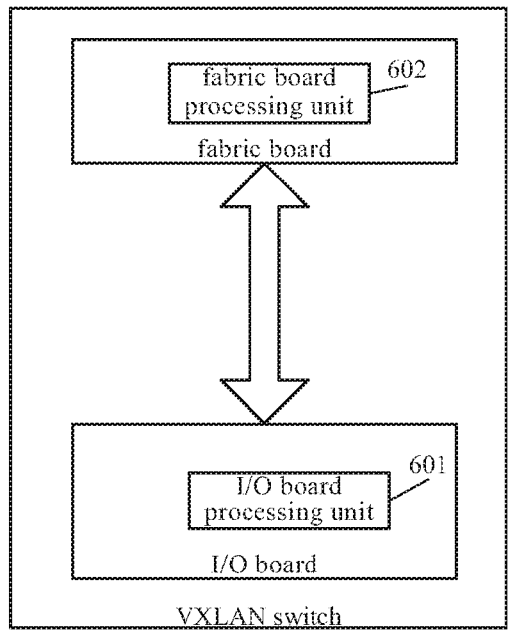
FIG. 6 is a diagram illustrating a structure of an apparatus for forwarding a packet from a VLAN to a VXLAN according to some examples of the present disclosure.

FIG. 6 is a diagram illustrating a structure of an apparatus for forwarding a packet from a VLAN to a VXLAN according to some examples of the present disclosure. The apparatus may be a VXLAN switch used as a gateway. The VXLAN switch includes an I/O board and a fabric board. The fabric board uses a chip with a forwarding function and various entry functions. As shown in FIG. 6, the VXLAN switch further includes an I/O board processing unit 601 and a fabric board processing unit 602.

The I/O board processing unit 601 is located on an I/O board of the VXLAN switch, and may receive a packet from a VLAN, search out a layer 3 entry matching a destination IP address of the packet from a local layer 3 table; when an egress port in the layer 3 entry is a VXLAN tunnel port, modify a source MAC address of the packet into a gateway MAC address of the VXLAN switch, modify a destination MAC address of the packet into a MAC address in the layer 3 entry, and send the modified packet to the fabric board of the VXLAN switch; receive a packet sent by the fabric board, add VXLAN encapsulation to the received packet, and forward the packet with the VXLAN encapsulation to a VXLAN.

The fabric processing unit 602 is located on the fabric board of the VXLAN switch, and may receive the packet sent by the I/O board, determine to perform layer 2 forwarding for the received packet, search out a MAC entry matching a destination MAC address of the packet from a local MAC table, and when an egress port in the MAC entry is a VXLAN tunnel port, send the packet to an I/O board associated with the egress port in the MAC entry in the gateway VXLAN switch.

In an example, the I/O board processing unit 601 may send the modified packet to the fabric board of the VXLAN switch through following processes.

The I/O board processing unit 601 adds first internal encapsulation to the modified packet. The first internal encapsulation includes a first destination chip identity and a first destination port identity. The first destination chip identity is a first virtual chip identity, and the first destination port identity is a first virtual port identity.

In an example, when the I/O board is connected with one fabric board, the I/O board processing unit 601 sends the packet with the first internal encapsulation via an inner port through which the I/O board is connected with the fabric board. When the I/O board is connected with multiple fabric hoards, the I/O board processing unit 601 sends the packet with the first internal encapsulation via one of inner port s through which the I/O board is connected with the multiple fabric boards respectively.

In an example, the fabric board processing unit 602 may determine to perform layer 2 forwarding for the received packet with the first internal encapsulation through following processes. The fabric board processing unit 602 determines the first destination chip identity and the first destination port identity in a first internal encapsulation header of the received packet with the first internal encapsulation. If the first destination chip identity is the first virtual chip identity and the first destination port identity is the first virtual port identity, the fabric board processing unit 602 removes the first internal encapsulation from the packet with the first internal encapsulation. When determining that the destination MAC address of the packet is not the gateway MAC address of the VXLAN switch after the first internal encapsulation is removed, the fabric board processing unit 602 determines to perform layer 2 forwarding for the packet.

In an example, the fabric board processing unit 602 may send the packet to the I/O board associated with the egress port in the MAC entry in the VXLAN switch through following processes.

The fabric board processing unit 602 adds second internal encapsulation to the packet, and sends the packet with the second internal encapsulation to the I/O board associated with the egress port in the MAC entry in the VXLAN switch. The second internal encapsulation may include information of the egress port in the MAC entry.

In an example, the I/O board processing unit 601 may add the VXLAN encapsulation to the received packet and forward the packet with the VXLAN encapsulation to the VXLAN through following processes.

The matched I/O board processing unit 601 determines the information of the egress port in a second internal encapsulation header of the packet and removes the second internal encapsulation from the packet. The matched I/O board processing unit 601 searches out a VXLAN tunnel encapsulation entry from a local VXLAN tunnel encapsulation table of the I/O board according to the information of the egress port, determines a VNID corresponding to the information of the egress port, adds VX LAN encapsulation to the packet according to the searched-out VXLAN tunnel encapsulation entry and the determined VNID, and sends the packet with the VXLAN encapsulation via an egress port in the VX LAN tunnel encapsulation entry.

In an example, the fabric board processing unit 602 may determine the I/O board associated with the egress port in the MAC entry through following processes.

The fabric board processing unit 602 searches out a local next-hop entry corresponding to a VXLAN tunnel associated with the egress port in the MAC entry.

When the next-hop entry includes one next hop, the fabric board processing unit 602 determines the next hop in the next-hop entry as a target next hop. When the next-hop entry includes multiple next hops, the fabric board processing unit 602 selects one next hop from the multiple next hops in the next-hop entry as the target next hop.

When an egress port corresponding to the target next hop in the next-hop entry is a single physical port, the fabric board processing unit 602 determines an board where the physical port is located as the I/O board associated with the egress port in the MAC entry. When the egress port corresponding to the target next hop in the next-hop entry is a physical port group in which multiple physical ports are bundled, the fabric board processing unit 602 determines an I/O board where one physical port in the physical port group is located as the I/O board associated with the egress port in the MAC entry.

Figure 7:
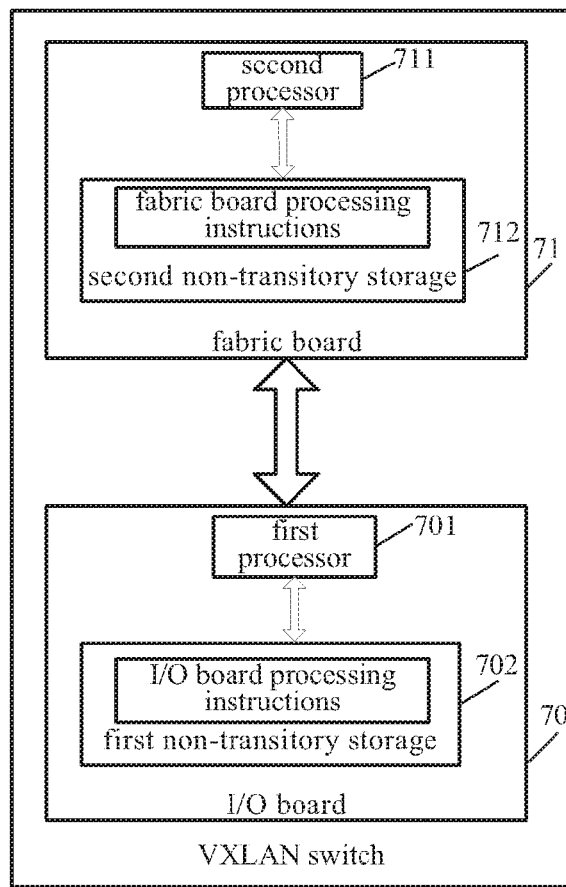
FIG. 7 is a diagram illustrating a hardware structure of an apparatus for forwarding a packet from a VLAN to a VXLAN according to some examples of the present disclosure.

A hardware structure of the apparatus for forwarding a packet from a VLAN to a VXLAN is also provided according to some examples of the present disclosure. The apparatus is a VXLAN switch used as a gateway. As shown in FIG. 7, the hardware structure of the VXLAN switch may include an I/O board 70 and a fabric board 71.

The I/O board 70 may include a first processor 701 (for example, a CPU) and a first non-transitory storage 702.

The first non-transitory storage 702 may store machine-readable instructions, which include I/O board processing instructions that can be executed by the first processor 701.

The first processor 701 may read and execute the I/O board processing instructions stored in the first non-transitory storage 702 to implement the functions of the I/O hoard processing unit shown in FIG. 6.

The fabric board 71 may include a second processor 711 (for example, a CPU) and a second non-transitory storage 712.

The second non-transitory storage 712 may store machine-readable instructions, which include fabric board processing instructions that can be executed by the second processor 711.

The second processor 711 may read and execute the fabric board processing instructions stored in the second non-transitory storage 712 to implement the functions of the fabric board processing unit shown in FIG. 6.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A packet forwarding method, comprising:
    receiving, by an Input/Output (I/O) board of a Virtual eXtensible Local Area Network (VXLAN) switch, a packet from a Virtual Local Area Network (VLAN), searching out a layer 3 entry matching a destination Internet Protocol (IP) address of the packet from a local layer 3 table; when an egress port in the layer 3 entry is a VXLAN tunnel port, modifying a source Media Access Control (MAC) address of the packet into a gateway MAC address of the VXLAN switch, modifying a destination MAC address of the packet into a MAC address in the layer 3 entry, and sending the modified packet to a fabric board of the VXLAN switch;
    receiving, by the fabric board of the VXLAN switch, the packet sent by the I/O board, determining to perform layer 2 forwarding for the received packet, searching out a MAC entry matching a destination MAC address of the packet from a local MAC table, and when an egress port in the MAC entry is a VXLAN tunnel port, sending the packet to an I/O board associated with the egress port in the MAC entry in the gateway VXLAN switch; and
    receiving, by the I/O board associated with the egress port in the MAC entry in the gateway VXLAN switch, the packet sent by the fabric board, adding VXLAN encapsulation to the received packet and forwarding the packet with the VXLAN encapsulation to a VXLAN,
    wherein the sending the modified packet to the fabric board of the VXLAN switch comprises:
        adding first internal encapsulation to the modified packet; and the first internal encapsulation includes a first destination chip identity and a first destination port identity, the first destination chip identity is a first virtual chip identity, and the first destination port identity is a first virtual port identity; and
        when the I/O board is connected with one fabric board, sending the packet with the first internal encapsulation via an inner port through which the I/O board is connected with the fabric board; when the I/O board is connected with multiple fabric boards, sending the packet with the first internal encapsulation via one of inner ports through which the I/O board is connected with the multiple fabric boards respectively; and
    the determining to perform layer 2 forwarding for the received packet by the fabric board comprises:
        determining the first destination chip identity and the first destination port identity in a first internal encapsulation header of the received packet; when the first destination chip identity is the first virtual chip identity and the first destination port identity is the first virtual port identity, removing the first internal encapsulation from the packet; when the destination MAC address of the packet is not the gateway MAC address of the VXLAN switch after the first internal encapsulation is removed, determining to perform layer 2 forwarding for the received packet.

2. The method of claim 1, wherein the sending the packet to the I/O board associated with the egress port in the MAC entry in the gateway VXLAN switch comprises:
    adding second internal encapsulation to the packet, and sending the packet with the second internal encapsulation to the I/O board associated with the egress port in the MAC entry in the gateway VXLAN switch; the second internal encapsulation includes information of the egress port in the MAC entry;
    the adding the VXLAN encapsulation to the received packet and forwarding the packet with the VXLAN encapsulation to the VXLAN comprises:
        determining the information of the egress port in a second internal encapsulation header of the packet, removing the second internal encapsulation from the packet, searching out a VXLAN tunnel encapsulation entry from a local VXLAN tunnel encapsulation table according to the information of the egress port, determining a Virtual Network ID (VNID) corresponding to the information of the egress port, adding the VXLAN encapsulation to the packet according to the searched-out VXLAN tunnel encapsulation entry and the determined VNID, and sending the packet with the VXLAN encapsulation via an egress port in the VXLAN tunnel encapsulation entry.

3. The method of claim 1, wherein the I/O board associated with the egress port in the MAC entry is determined through a process of:
    searching out a local next-hop entry corresponding to a VXLAN tunnel associated with the egress port in the MAC entry;
    when the next-hop entry includes one next hop, determining the next hop in the next-hop entry as a target next hop; when the next-hop entry includes multiple next hops, selecting one next hop from the multiple next hops in the next-hop entry as the target next hop; and
    when an egress port corresponding to the target next hop in the next-hop entry is a single physical port, determining an I/O board where the physical port is located as the I/O board associated with the egress port in the MAC entry; when the egress port corresponding to the target next hop in the next-hop entry is a physical port group in which multiple physical ports are bundled, determining an I/O board where one physical port in the physical port group is located as the I/O board associated with the egress port in the MAC entry.

4. A Virtual eXtensible Local Area Network (VXLAN) switch, comprising:
    an Input/Output (I/O) board processing unit, located on an I/O board of the VXLAN switch, and to receive a packet from a Virtual Local Area Network (VLAN), search out a layer 3 entry matching a destination Internet Protocol (IP) address of the packet from a local layer 3 table; when an egress port in the layer 3 entry is a VXLAN tunnel port, modify a source Media Access Control (MAC) address of the packet into a gateway MAC address of the VXLAN switch, modify a destination MAC address of the packet into a MAC address in the layer 3 entry, and send the modified packet to a fabric board of the VXLAN switch; receive a packet sent by the fabric board, add VXLAN encapsulation to the received packet, and forward the packet with the VXLAN encapsulation to a VXLAN; and a fabric board processing unit, located on the fabric board of the VXLAN switch, and to receive the packet sent by the I/O board, determine to perform layer 2 forwarding for the received packet, search out a MAC entry matching a destination MAC address of the packet from a local MAC table, and when an egress port in the MAC entry is a VXLAN tunnel port, send the packet to an I/O board associated with the egress port in the MAC entry in the VXLAN switch, wherein the I/O board processing unit is to send the modified packet to the fabric board of the VXLAN switch through a process of:

adding first internal encapsulation to the modified packet; and the first internal encapsulation includes a first destination chip identity and a first destination port identity, the first destination chip identity is a first virtual chip identity, and the first destination port identity is a first virtual port identity; and when the I/O board is connected with one fabric board, sending the packet with the first internal encapsulation via an inner port through which the I/O board is connected with the fabric board; when the I/O board is connected with multiple fabric boards, sending the packet with the first internal encapsulation via one of inner ports through which the I/O board is connected with the multiple fabric boards respectively; and the fabric board processing unit is to determine to perform layer 2 forwarding for the received packet with the first internal encapsulation through a process of:

determining the first destination chip identity and the first destination port identity in a first internal encapsulation header of the received packet; when the first destination chip identity is the first virtual chip identity and the first destination port identity is the first virtual port identity, removing the first internal encapsulation from the packet; when the destination MAC address of the packet is not the gateway MAC address of the VXLAN switch after the first internal encapsulation is removed, determining to perform layer 2 forwarding for the received packet.

5. The VXLAN switch of claim 4, wherein the fabric board processing unit is to send the packet to the I/O board associated with the egress port in the MAC entry in the VXLAN switch through a process of:

adding second internal encapsulation to the packet, and sending the packet with the second internal encapsulation to the I/O board associated with the egress port in the MAC entry in the gateway VXLAN switch; the second internal encapsulation includes information of the egress port in the MAC entry;

the I/O board processing unit is to add the VXLAN encapsulation to the received packet and forward the packet with the VXLAN encapsulation to the VXLAN through a process of:

determining the information of the egress port in a second internal encapsulation header of the packet, removing the second internal encapsulation from the packet, searching out a VXLAN tunnel encapsulation entry from a local VXLAN tunnel encapsulation table according to the information of the egress port, determining a Virtual Network ID (VNID) corresponding to the information of the egress port, adding the VXLAN encapsulation to the packet according to the searched-out VXLAN tunnel encapsulation entry and the determined VNID, and sending the packet with the VXLAN encapsulation via an egress port in the VXLAN tunnel encapsulation entry.

6. The VXLAN switch of claim 4, wherein the fabric board processing unit is to determine the I/O board associated with the egress port in the MAC entry through a process of:

searching out a local next-hop entry corresponding to a VXLAN tunnel associated with the egress port in the MAC entry;

when the next-hop entry includes one next hop, determining the next hop in the next-hop entry as a target next hop; when the next-hop entry includes multiple next hops, selecting one next hop from the multiple next hops in the next-hop entry as the target next hop; and when an egress port corresponding to the target next hop in the next-hop entry is a single physical port, determining an I/O board where the physical port is located as the I/O board associated with the egress port in the MAC entry; when the egress port corresponding to the target next hop in the next-hop entry is a physical port group in which multiple physical ports are bundled, determining an I/O board where one physical port in the physical port group is located as the I/O board associated with the egress port in the MAC entry.

\* \* \* \* \*